Patented Oct. 28, 1924.

1,513,323

UNITED STATES PATENT OFFICE.

WILLARD H. KEMPTON, OF WILKINSBURG, PENNSYLVANIA, ASSIGNOR TO WESTING-HOUSE ELECTRIC & MANUFACTURING COMPANY, A CORPORATION OF PENNSYLVANIA.

MOLDABLE COMPOSITION AND METHOD OF MAKING THE SAME.

No Drawing. Application filed March 11, 1919. Serial No. 281,907.

*To all whom it may concern:*

Be it known that I, WILLARD H. KEMPTON, a citizen of the United States, and a resident of Wilkinsburg, in the county of Allegheny and State of Pennsylvania, have invented a new and useful Improvement in Moldable Compositions and Methods of Making the Same, of which the following is a specification.

My invention relates to moldable compositions and more particularly to compositions comprising fibrous material impregnated with a suitable binder, such as shellac or one of the numerous shellac substitutes as, for example, a phenolic condensation product.

Heretofore, numerous articles employed in the electric and other arts have been made of moldable compositions comprising a suitable filler impregnated with a phenolic condensation product, such as bakelite, as a binder. In most cases, the filler employed has been either a granular or powdered filler, such as wood flour, cork or the like, a short-fibre filler, such as, comminuted asbestos, or a laminated filler, comprising superimposed layers of fibrous sheet material, such as paper, duck, or other fabric.

Such fillers, when treated with a binder, of the character specified, and cured properly, as by the application of heat and pressure, are very satisfactory for certain purposes. However, a comminuted filler, such as wood flour, or a short-fibre filler, such as comminuted asbestos, does not possess sufficient strength for some purposes although its strength is relatively uniform. On the other hand, a body comprising superimposed layers of fibrous sheet material and a hardened phenolic condensation product possesses unusually great mechanical strength in one direction but does not possess as great strength as is required, in some instances, in an opposite direction. Also, the sheet material may be conveniently formed into bodies of uniform thickness only.

To overcome these objections, attempts have been made, by various methods, to provide a moldable composition comprising long fibres, and particularly long cotton fibres, impregnated with a suitable binder, such as a phenolic condensation product, as it has been appreciated that a body molded from such material would possess uniform strength, in all directions, and a strength considerably exceeding that of moldable compositions having a granular or short-fibre filler. Furthermore, such a moldable mixture may be readily formed into bodies of irregular thickness.

Previously, no such composition has been devised, to the best of my knowledge. For example, if a phenolic condensation product, such as bakelite, is powdered, by itself or with any other powdered binder, and is mixed with long cotton fibres, in a dry mixing mill, the fibres merely wad up into lumps into which the powdered material cannot be driven uniformly. Because of this, articles molded from such material possess no uniformity, either in composition or strength.

Another method, which has been practised, has been to add the binder, in the form of a liquid or a solution, to the cotton fibre. When this is done, the impregnated fibre may be uniformly dried only with the greatest difficulty and, when dried, it is so heavy and lumpy that it must be ground in a mill, or other suitable machine, to sufficiently disintegrate it so that its fibres may be scattered to produce a uniform body. This grinding of the lumped fibres, however, largely destroys them so that the strength of articles molded from them is materially reduced. For this reason, it has heretofore been practically impossible to provide a moldable composition comprising long, loose fibres, of cotton or other material, uniformly impregnated with a binder, such as a phenolic condensation product.

The primary object of my invention resides in the provision of a simple, economical and efficient method of providing a moldable composition, of the desired character, in which the filler shall comprise undamaged, long fibres, of cotton or other material.

I have found that woven fabrics, in sheet form, such as various forms of cloth, may be readily and uniformly impregnated with a phenolic condensation product, in liquid form or in solution, and may then be dried without changing the character of the binder employed. The impregnated sheet material may then be shredded, chopped up, ground or otherwise comminuted to provide a loose, fluffy mass of long fibres which are substantially uniformly impregnated with the binder employed.

In practising my invention, I may impregnate a fabric or woven sheet material, of cotton or other fibre, such as duck, muslin or the like, with a suitable percentage of a phenolic condensation product, in liquid form or in a solution, and dry the impregnated sheet material, at a relatively low temperature. The sheet material is then comminuted in any suitable manner to provide the desired, fluffy mass of moldable composition. This may be done by grinding the fabric, shredding it or chopping it up as preferred.

Obviously, linen, hemp and other fibres may be employed as well as cotton fibres, or mixtures of several kinds of fibres may be utilized. Furthermore, pieces of fibrous sheet material, remaining after cutting blanks from impregnated sheets for use in the manufacture of laminated bodies, may be scrapped or shredded to provide my moldable composition and it is thus possible to utilize material which has heretofore been wasted. It will, therefore, be understood that no limitations are to be imposed upon my invention other than those necessitated by the prior art or specifically indicated in the claims.

I claim as my invention:

1. A moldable composition consisting of a phenolic condensation-impregnated woven fabric, in comminuted form.

2. A moldable composition consisting of a phenolic condensation-impregnated long-fibred sheet material, in comminuted or shredded form.

3. A moldable composition consisting of a phenolic condensation-impregnated duck, in finely divided form.

4. A molded material comprising a heat compacted mass of shredded sheet material having a coating of thermoplastic binder.

5. The method of making molded material which consists in coating fibrous material in sheet form with a thermoplastic material, then subdividing said sheet material and finally molding the product under heat and pressure.

6. The method of making moldable mixtures which comprises coating fibrous sheet material with a phenolic condensation product and subdividing said sheet material.

7. The method of making moldable mixtures which comprises coating fibrous sheet material with a solution of a thermo-plastic binder, and drying and subdividing said sheet material.

8. The method of making moldable mixtures which comprises coating fibrous sheet material with a solution of a phenolic condensation product, and drying and subdividing said sheet material.

In testimony whereof, I have hereunto subscribed my name this 28th day of Feb., 1919.

WILLARD H. KEMPTON.